Jan. 26, 1960   F. J. VON BOMHARD   2,922,502
CLUTCH AND TRANSMISSION SYSTEM FOR MOTOR VEHICLES
Filed April 3, 1958

INVENTOR:
FRANZ-JOSEF VON BOMHARD
By
Richardson, David and Nordon
Arry's.

United States Patent Office 2,922,502
Patented Jan. 26, 1960

2,922,502

CLUTCH AND TRANSMISSION SYSTEM FOR MOTOR VEHICLES

Franz Josef von Bomhard, Schweinfurt (Main), Germany, assignor to Fichtel & Sachs A.G., Schweinfurt (Main), Germany, a corporation of Germany Application April 3, 1958, Serial No. 726,169

Claims priority, application Germany April 12, 1957

5 Claims. (Cl. 192—.08)

This invention relates to clutch and transmission control systems for motor driven vehicles which combine the following features:

(1) A manual gear shifting lever and mechanism automatically responsive thereto for disengaging the clutch, regardless of motor speed, as an incident of and during gear shifting, and permitting automatic reengagement of the clutch at the conclusion of gear shifting.

(2) Throttle controlling mechanism which is operative only during disengagement of the clutch by the disengaging mechanism referred to above and which prevents the engine speed from dropping below a predetermined minimum speed during gear shifting, except when the vehicle is stopped or is moving very slowly.

A system of the kind referred to is disclosed in United States Patent No. 2,766,862 of Richard Binder issued October 16, 1956. As pointed out in the patent, however, the clutch may fail to become automatically reengaged at the conclusion of gear shifting unless the operator has taken care to maintain the motor at or above the prescribed clutch engaging speed through his control of the foot accelerator. According to the patent this problem is solved by providing a special throttle controlling means, supplementary to the foot accelerator and automatically responsive to the gear shifting lever, to maintain a throttle opening during gear shifting and for a short time after gear shifting, sufficient to assure the maintenance of a clutch engaging speed of the motor; i.e., a speed substantially above idling speed.

This device operates in an entirely satisfactory manner when shifting between forward speeds, either up or down, but it involves the drawback that even when the vehicle is standing still the motor speed is automatically increased in response to gear shift lever actuation. This leads to difficulty in shifting into low and reverse gears from neutral, causing the vehicle to be subjected to a jerky impulse forward or backward. It also prevents the motor from operating at idling speed when the vehicle is at a standstill and the gear shift lever is in the neutral position.

In order to avoid this impulse or at least to keep it as small as possible, it has been attempted to keep the motor speed to which the motor is increased during shifting to the lowest possible value. This, however, impairs the engaging properties of the clutch during motion of the vehicle.

It has been proposed to connect the controlling circuit of such automatic speed responsive clutch installations, for example, centrifugal force clutches, to the generator of the motor in such a way that the clutch does not respond at low motor speeds to the servo-activation of the clutch, and thus the speed increase does not become effective. This arrangement, however, has drawbacks, the most important one consisting in that the motor speed does not permit the clutch to go back to the disengaged condition when the vehicle is standing still, as soon as a little gas is given during the shifting process. Moreover, the dependence of such installations on the voltage increase of the generator, which is subject to fluctuations, leads to disturbances in the driving operation.

It is the primary object of the invention to eliminate these disadvantages. To this end the speed increase of the motor during gear shifting is suppressed, according to the invention, when the vehicle is standing still or is traveling at low velocity, but is allowed to become effective only from a certain minimum velocity upward (in passenger motor vehicles starting at about ten miles per hour).

In automatic clutch installations, in which the clutch disengagement is effected through negative pressure provided by the motor and the advance of the throttle is effected through a special organ, for example, a diaphragm, the impulse on the throttle can be suppressed according to the invention by providing a magnetic valve in the suction line to the diaphragm which receives its current from a switch dependent on the driving speed, and which, with the vehicle at rest or moving at low velocity, closes the suction line to the diaphragm.

In electromagnetic clutches or electromagnetically controlled mechanical clutches the throttle advance can be controlled through a solenoid, which becomes energized only when a main switch, for example the switch controlled by the gear shifting lever, and a series connected, speed controlled second switch are closed, the second in response to the vehicle velocity having attained a prescribed minimum value.

In Figures 1 and 2 is shown an example of an automatic clutch controlled by suction.

Figure 1:
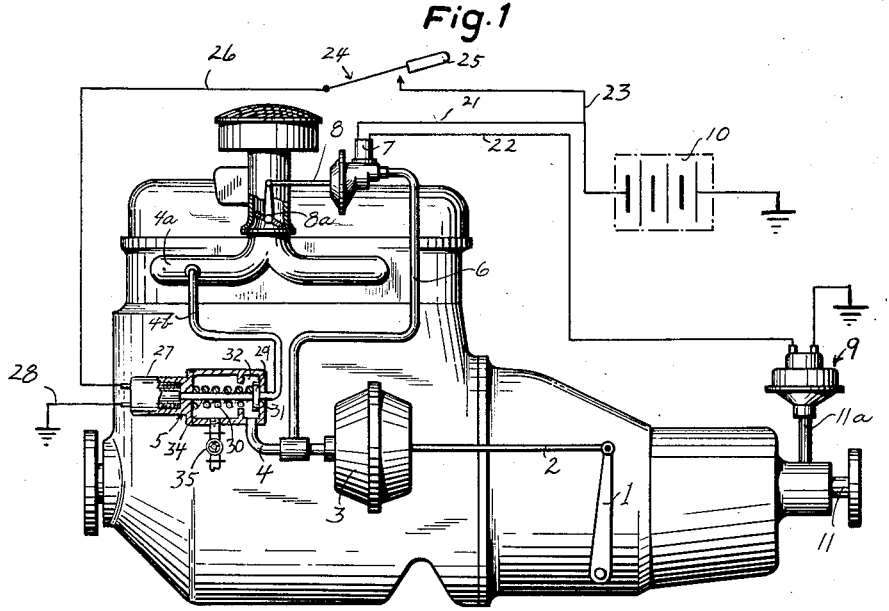
Figure 1 is a diagrammatic view in elevation, showing the various organs belonging to the clutch installation.

In Figure 1 a disengaging lever 1 of a clutch, not shown, is connected through a link 2 with a piston servo-motor 3. The servo-motor 3 is connected through a pipe line 4 with a control valve unit 5, and the valve unit 5 may, in turn, be connected through a suction line 4b with the motor intake manifold 4a. The line 4, at a point between the control valve 5 and the servo-motor 3, is connected through a branch pipe line 6 to an electromagnetically controlled valve 7 according to the invention, which valve is built into one unit with a supplementary gas feeding diaphragm 12. The gas feeding diaphragm 12 is connected to the throttle valve 8a through a link and lever system 8. The valve 7 has an electromagnetic winding 14 electrically connected through conductors 21 and 22 on the one side to the battery 10 through the usual ignition switch (not shown), on the other side to a speed controlled switch 9, which is driven by the propeller shaft 11 along with the vehicle wheels (not shown) through the speedometer shaft 11a, and is thus caused to rotate at a speed proportional to the velocity at which the vehicle is moving.

Figure 2:
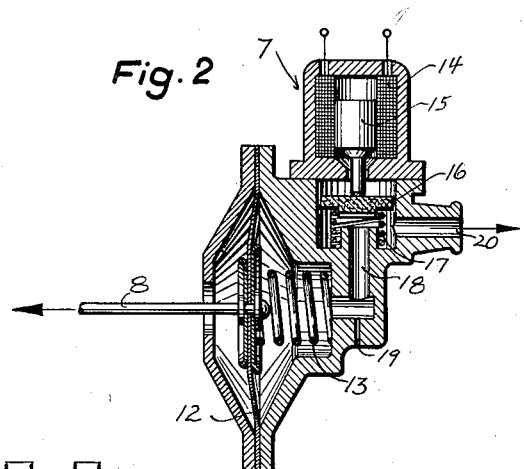
Figure 2 is a view in sectional elevation, showing a magnetic valve with which the suction line to the throttle advancing diaphragm is closed with the vehicle at a standstill or moving at low velocity.

As seen in Figure 2 the throttle actuating diaphragm 12 is exposed on the left side to the presence of the atmosphere, while on the right side it is connected through the pipe line 6 with the suction effect of the intake manifold 4a during the coupling process. A spring 13 urges the diaphragm 12 to the left and thus tends to maintain the throttle 8a in idling position. The magnet 14, which is connected through the electrical conductors 21 and 22 in series with the battery 10 and the speed responsive switch 9, is provided with an armature or plunger 15, which as soon as the magnet is excited, is forced downwardly and pushes the valve plate 16 downward against the pressure of the spring 17, closing the bore 18. The space between the diaphragm 12 and the valve 16 is connected with the atmosphere through a fine bore 19. To the nipple 20 is joined the connecting line 6.

The battery 10, which has one terminal grounded, has its other terminal connected through a conductor 23, a switch 24 under the control of the gear shift lever 25, and a conductor 26, to one terminal of an electromagnetic winding 27 which forms part of the valve unit 5. The opposite terminal of the winding 27 is connected to ground through a conductor 28. A valve 29 carried by the armature of the electromagnet is urged toward the right by a spring 30, being normally maintained in position to cover a port 31 and thereby close off the suction pipe 4 from communication with a chamber 32 in the body of the valve unit 5. When the winding 27 is energized, the valve 29 is drawn toward the left to uncover the port 32 and thereby place the suction pipe 4 in communication with the chamber 32 and with the pipes 4b and 6. The valve 29 moves across to cover a port 33 and thereby shut off the chamber 32 from communication with an atmospheric air chamber 34. The chamber 34 has limited communication with the atmosphere at all times through a manually settable valve 35. Energization of the winding 27 through actuation of the gear shift lever 25 is effective to apply intake suction to the servo-motor 3 for releasing the clutch, and it may or may not be effective also to apply suction to the throttle advancing diaphragm 12, depending upon the condition of the valve 16.

The mode of the action of this device is as follows:

During gear shifting the control valve 5 is influenced electromagnetically to connect the intake manifold 4a, and the pipe 4b with the pipe line 4, and brings about the application of suction to the servomotor 3 through the pipe 4. This effects the disengagement of the clutch through the link 2 and the lever 1. At the same time with the activation of the servo-motor, the magnetic valve 7 is connected through the pipe line 6 with the motor suction, through which the link and lever system 8 is moved to the right. As the spring 13 is overcome through the action of the atmosphere on the diaphragm 12, the throttle 8a is opened somewhat, and thus an increase of the minimum motor speed is brought about. The speed responsive switch 9 is so formed that with the vehicle at rest or moving at a low speed, it is closed and effects the energization of the winding 14. When the vehicle is standing still or is traveling slowly, therefore, the bore 18 is closed by the valve 16, so that the suction in the pipe 6 cannot be applied to the diaphragm 12. The space behind the diaphragm 12 is maintained at atmospheric pressure through the bore 19 in this situation, so that the actuation of the throttle 8a by the diaphragm 12 is suppressed. Only when the rotation of the shaft 11 assumes a prescribed minimum speed (corresponding in a passenger vehicle to about ten miles per hour) does the speed responsive switch 9 open and thereby effect an interruption of current flow through the magnet 14. The valve 16, under the influence of the spring 17, is thereupon opened, so that the negative motor pressure can act on the diaphragm 12.

The bore 19 is so dimensioned that it effects a rapid dissipation of negative pressure in the space between the diaphragm 12 and valve 16, but on the other hand causes no disturbance of the motor operation by allowing the atmosphere to stream in when the valve 16 is opened.

The object of the invention can, of course, be realized in varied ways. Thus, for example, instead of the speed responsive switch 9 being driven by the speedometer shaft, the speedometer indicator can be used directly to effect a closing of the circuit to the winding 14 in the velocity range from zero to about ten miles per hour.

In electromagnetic clutches or mechanical clutches which are disengaged electromagnetically during the shifting process, the automatic throttle advance is most advantageously accomplished by a small solenoid, which is not energized with the vehicle at rest or at low driving speeds, but only at and above a predetermined minimum driving speed. For this it is merely necessary to lead the connection of this solenoid to the current source through two series connected switches, one being closed by actuation of the gear shift lever to release the clutch, and the second being arranged to close only after the desired driving speed is attained.

Figure 3:
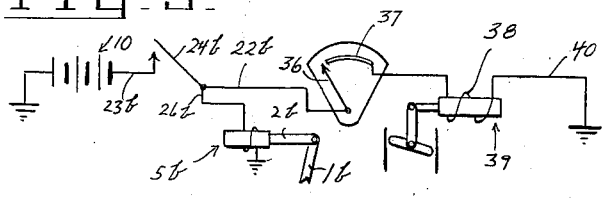
Figure 3 is a diagrammatic view of a modified form of clutch and throttle control.

This type of control is diagrammatically illustrated in Figure 3. In Figure 3 the battery 10 is shown as having one of its terminals grounded and the other connected through a conductor 23b with a gear shift lever controlled switch 24b. From the switch 24b a conductor 26b goes to the winding of a solenoid 5b and thence to ground. The armature of the solenoid 5b is directly connected through a link 2b with the clutch releasing lever 1b, so that the clutch is automatically released by the solenoid in response to the closing of the switch 24b. From the switch 24b a second conductor 22b goes to the speedometer indicator 36 which at all speeds above a predetermined minimum travels in contact with a conductor 37. The conductor 37 is connected to the winding 38 of a solenoid 39, said winding being connected to ground through a conductor 40. The armature of the solenoid 39 is connected to a link 8b through which a predetermined minimum advance of the throttle sufficient normally to maintain the clutch engaged, is assured so long as the solenoid 39 is energized.

Various changes and modifications may be made without departing from the spirit and scope of the invention as defined in the annexed claims.

What is claimed is:

1. An operating system for motor vehicles comprising the combination with a clutch, a throttle and a gear shift lever, of means responsive to gear shifting operation of the gear shift lever to disengage the clutch regardless of motor speed and to permit reengagement of the clutch when the gear shifting has been completed, throttle controlling means disposed for operation during and in response to gear shifting operations of the gear shift lever to maintain the throttle adavnced far enough to cause the motor to run at a speed higher than idling speed until after the gear shifting is completed, and means responsive to the vehicle speed to suppress the operation of said throttle controlling means when the vehicle is at rest or running below a predetermined minimum speed, but to render the supplementary throttle advancing means active when the vehicle is running at or above such minimum speed.

2. An operating system for motor vehicles as set forth in claim 1, in which the means for releasing the clutch during gear shifting operations regardless of speed comprises a suction operated servo-motor, and electromagnetic means responsive to the gear shift lever for controlling the application of suction to the servo-motor, wherein the supplementary means for automatically maintaining the throttle advanced during gear shifting comprises a suction operated diaphragm, and in which the means for suppressing and activating the supplementary throttle advancing means comprises a speed responsive electromagnetically controlled valve for controlling the application of suction to said diaphragm.

3. An operating system as set forth in claim 2, further comprising a speedometer shaft, and a speedometer controlled switch, said switch being connected to determine whether the valve which controls the application of suction to the throttle advancing diaphragm shall be opened or closed, said switch being connected to said speedometer shaft for actuation when the speed of said speedometer shaft exceeds a predetermined minimum speed.

4. An operating system as set forth in claim 1, in which the means for releasing the clutch during gear shifting operations regardless of motor speed comprises a first solenoid and a main switch responsive to the gear shift lever, said main switch being connected to control said first solenoid, and wherein the supplementary means for automatically maintaining the throttle advanced during gear shifting comprises a second solenoid connected in series with the main switch, and in which the means for suppressing and activating the supplementary throttle advancing means consists of a further switch also connected in series with the second solenoid said further switch being responsive to the speed of the vehicle.

5. An operating system as set forth in claim 4, further comprising a speedometer which indicates the vehicle speed, said second switch being actuated by said speedometer when the vehicle speed exceeds a predetermined minimum speed.

References Cited in the file of this patent

UNITED STATES PATENTS

| | | |
|---|---|---|
| 2,160,331 | Hill | May 30, 1939 |
| 2,181,532 | Hill et al. | Nov. 28, 1939 |